United States Patent [19]

Sato et al.

[11] Patent Number: 4,871,238

[45] Date of Patent: Oct. 3, 1989

[54] PHOTOGRAPHIC OPTICAL DEVICE WITH VARIABLE MAGNIFICATION

[75] Inventors: Yasuhisa Sato, Kanagawa; Yasuyuki Yamada, Tokyo; Hiroki Nakayama; Kouji Oizumi, both of Kanagawa, all of Japan

[73] Assignee: Canon Kabushiki Kaisha, Tokyo, Japan

[21] Appl. No.: 19,687

[22] Filed: Feb. 27, 1987

[30] Foreign Application Priority Data

Mar. 6, 1986 [JP] Japan ................................. 61-049329
Apr. 17, 1986 [JP] Japan ................................. 61-088738

[51] Int. Cl.$^4$ ............................................. G02B 15/02
[52] U.S. Cl. .................................................... 350/422
[58] Field of Search ......................................... 350/422

[56] References Cited

U.S. PATENT DOCUMENTS

| 2,256,228 | 9/1941 | Zimmermann | 350/422 |
| 3,741,621 | 6/1973 | McCrobie | 350/422 |
| 4,643,536 | 2/1987 | Yamada et al. | 350/422 |

Primary Examiner—Bruce Y. Arnold
Assistant Examiner—Rebecca D. Gass
Attorney, Agent, or Firm—Fitzpatrick, Cella, Harper & Scinto

[57] ABSTRACT

A photographic optical device of this invention comprises: a master lens unit having a positive refractive power, determining a photographic optical path and moving along the optical axis to change magnification; a first auxiliary lens unit having a positive refractive power and being capable of being placed on and off the optical path; and a second auxiliary lens unit having a negative refractive power and being capable of being placed on and off the optical path. The first auxiliary lens unit is attached to an image-plane side of the master lens unit to form a photographic unit giving a low ratio of magnification. The second auxiliary lens unit is attached to an image-plane side of the master lens unit to form another photographic unit giving a high ratio of magnification. The first and second auxiliary lens units are placed outside of the optical path to form another photographic unit giving a middle ratio of magnification.

9 Claims, 7 Drawing Sheets

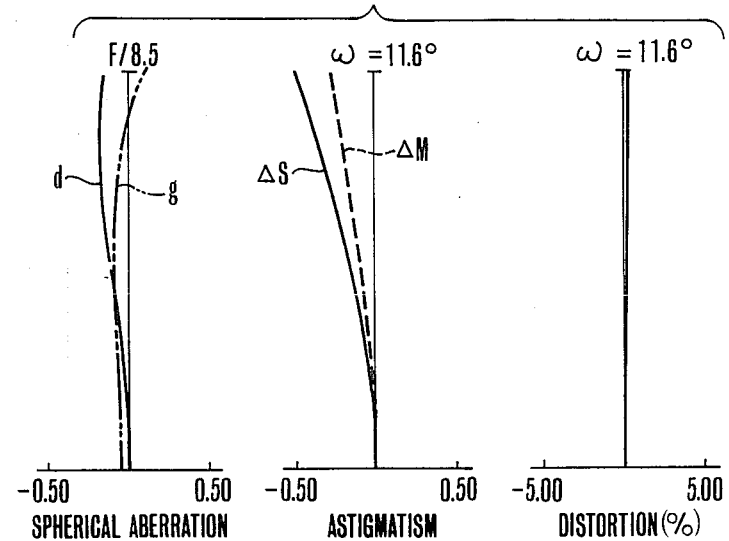

PHOTOGRAPHIC OPTICAL DEVICE WITH VARIABLE MAGNIFICATION

BACKGROUND OF THE INVENTION

1. Field of the Invention

The present invention relates to a switchable type optical device with variable magnification suitable for use with a photographic camera or a video camera, and more particularly to a small-size switchable type optical device with variable magnification which comprises three photographic units each having a different focal length, the three photographic units including a master lens unit as a common unit and two auxiliary lens units disposed on the side of an image plane of the master lens unit in such a manner that they can be freely placed on and off the optical axis of the master lens unit, thereby easily achieving a relatively high ratio of variable magnification and a high optical performance.

2. Description of the Related Art

Various proposals have heretofore been made with respect to a switchable type optical device with variable magnification employing a so-called conversion lens, namely, an auxiliary lens unit which is attached to the object or image-plane side of the master lens unit so as to be capable of varying the total focal length of the optical device while maintaining the total focal plane of the same at a fixed position. However, a so-called front conversion method in which a conversion lens is attached to the object side of the master lens unit has a particular tendency to increase the lens diameter of the conversion lens, and thus difficulty is experienced in reducing the overall size of the optical device.

On the other hand, a so-called rear conversion method in which a conversion lens is attached to the image-plane side of the master lens unit provides the merit of reducing the lens diameter as compared with the aforesaid front conversion method but involves difficulties in terms of correcting various aberrations. As a result, the number of lens elements employed is increased. As described in U.S. Pat. No. 4,340,279, this in turn requires an increase in the overall length of the lens system. To overcome this problem, U.S. Pat. No. 4,422,734 proposes a lens arrangement consisting of a reduced number of lens elements, but difficulty is encountered in increasing the ratio of variable magnification with this prior art.

Japanese Laid-open Patent Application No. SHO 59-29214 proposes a wide-angle conversion lens employing a rear conversion method in which a lens unit having a positive refractive power is disposed at the rear of the master lens unit so as to shorten the total focal length of the optical device.

However, the wide-angle conversion lens proposed in the above patent application involves the disadvantage in that, when the conversion lens is attached to the master lens unit, the conversion ratio obtained is small, i.e. 2 or less, while the lens system as a whole is increased in length and size.

Japanese Patent Publication No. SHO 58-38778 proposes a small-size switchable type optical device with variable magnification in which two lens units such as a standard lens and a telephoto lens are disposed in side-by-side relation facing an object to be photographed, either of these lenses being selectively used by means of a movable reflecting mirror incorporated in the camera body. However, this optical device with variable magnification involves the disadvantage that, since the focal lengths of these lens units differ, the individual lens units must be extended by different distances with respect to an object disposed at a distance from the same camera.

In cases where the aforesaid optical device is utilized in, for example, an autofocus camera, the respective lens units are arranged to be capable of extending by respectively different distances in standard-lens and telephoto-lens conditions. Thus, there is a tendency for the internal mechanism of the camer per se to become complicated.

Japanese Laid-open Patent Application No. SHO 53-33624 gives a diagrammatic illustration of a photographic device in which a positive lens is placed on and off the optical axis on the image-plane side of the master lens unit while a positive attachment lens unit is detachably mounted on the object side of the master lens unit. However, this proposal has the disadvantage that the use of a structure in which a fixed ring of the attachment lens unit is screwed into one end of a lens barrel precludes rapid switchover.

SUMMARY OF THE INVENTION

It is therefore an object of the present invention to provide an optical device giving a high degree of magnification.

It is another object of the present invention to provide an optical device which is arranged to extend by a fixed length irrespective of the magnification setting employed at any given time even when objects that are in the range of "infinity' or close to the camera are brought into focus, thereby improving its operability.

It is another object of the present invention to provide an optical device in which the operation of selecting a magnification setting is easy.

The above and other objects and features of the invention will become apparent from the following detailed description of embodiments thereof taken in connection with the accompanying drawings.

BRIEF DESCRIPTION OF THE DRAWINGS

FIGS. 3(A), 3(B), 3(C), 5(A), 5(B) and 5(C) are respectively graphs of various aberrations relating to Numerical Examples 1 and 2 in accordance with the present invention.

DETAILED DESCRIPTION OF THE PREFERRED EMBODIMENT

Figure 1A:
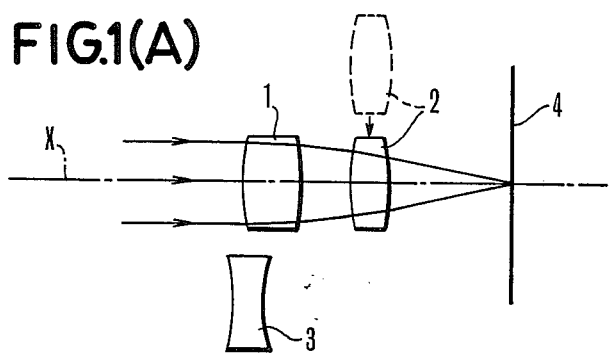
FIGS. 1(A), 1(B) and 1(C) are diagrammatic illustrations of the basic constructions of one example of an optical device in accordance with the present invention.
Figure 1B:
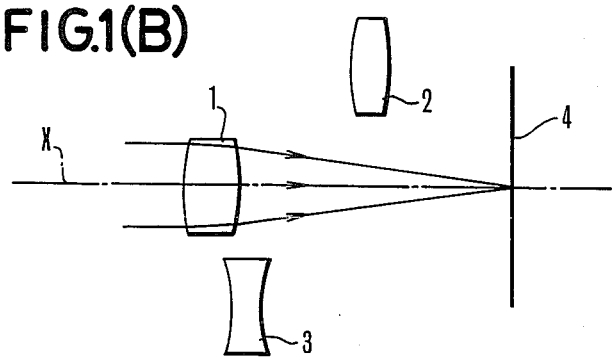
Figure 1C:
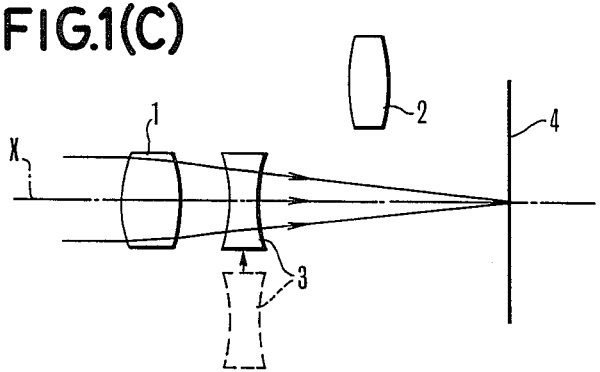
Figure 2A:
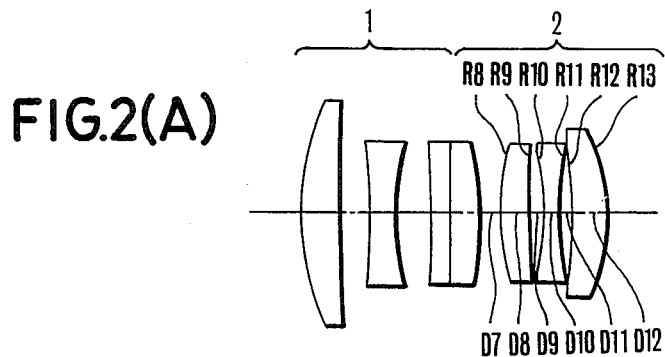
FIGS. 2(A), 2(B), 2(C), 4(A), 4(B) and 4(C) are sectional views diagrammatically showing lens elements relating to Numerical Examples 1 and 2 in accordance with the present invention.
Figure 2B:
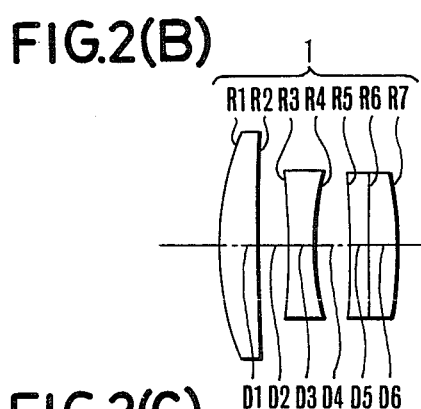
Figure 2C:
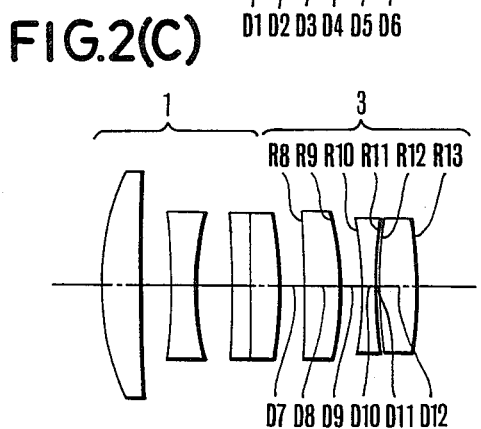
Figure 3A:
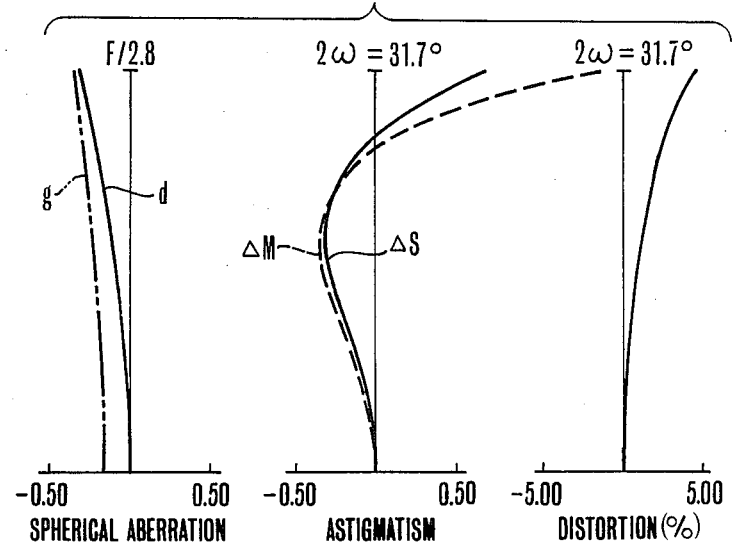
Figure 3B:
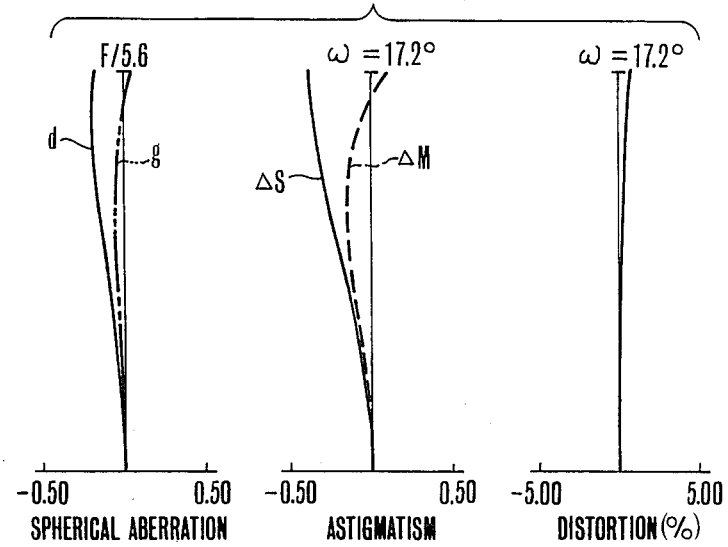
Figure 4A:
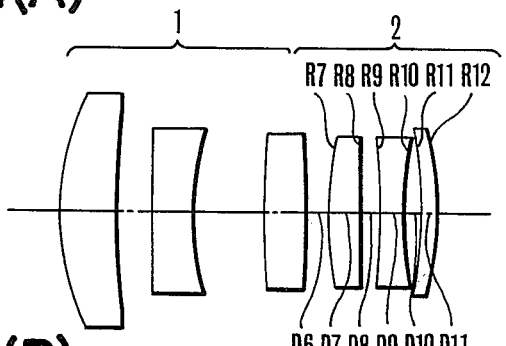
Figure 4B:
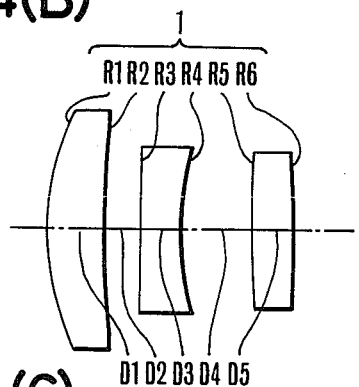
Figure 4C:
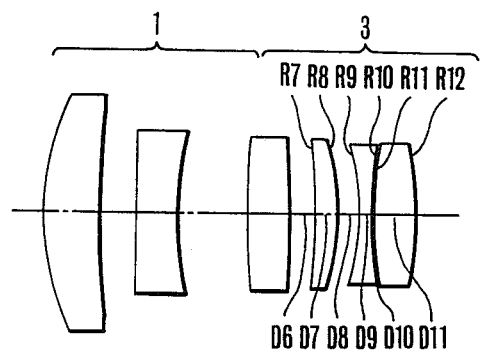
Figure 5A:
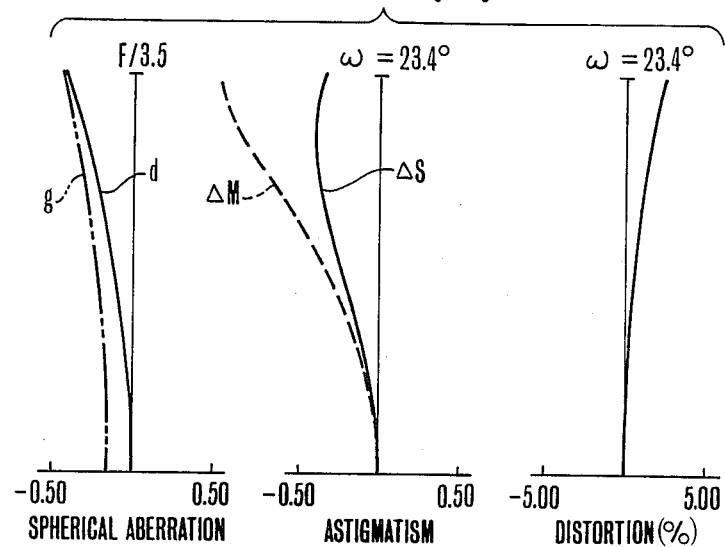
Figure 5B:
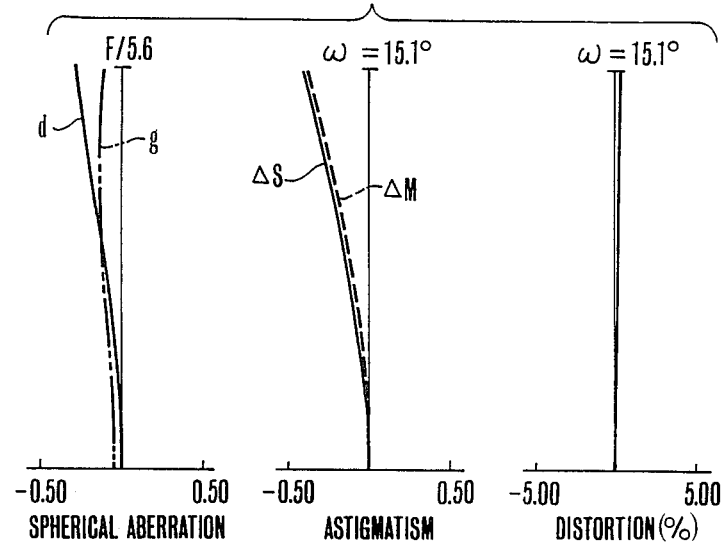
Figure 5C:
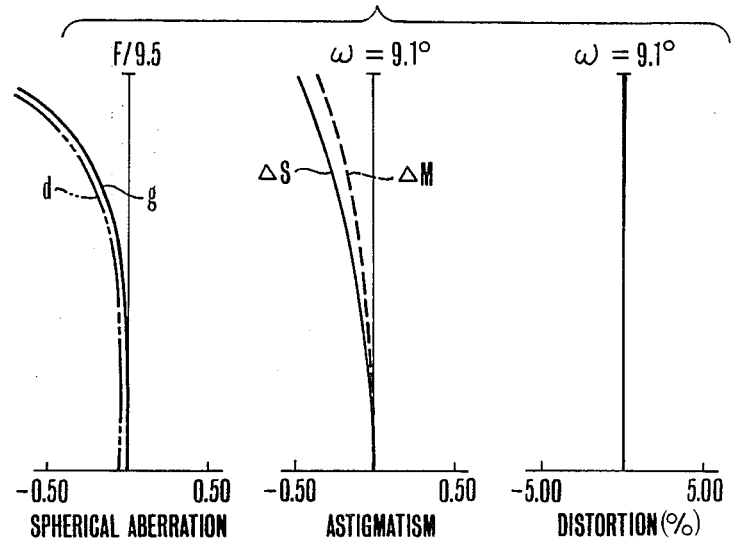

FIGS. 1(A), 1(B) and 1(C) diagrammatically show first, second and third photographic units constituting a switchable type optical device with variable magnification in accordance with the present invention. The optical device shown in FIGS. 1(A), 1(B) and 1(C) essentially comprises a master lens unit 1 of a positive refractive power, a first auxiliary lens unit 2 of a positive refractive power and a second auxiliary lens unit 3 of a negative refractive power. A photosensitive surface is indicated at 4. The lens units 1, 2 and 3 are illustrated respectively as single elements as a matter of convenience, but in reality may be constituted by a plurality of elements. For example, FIGS. 2(A)-2(C) and 4(A)-4(C) illustrate various lens units comprising a variety of lens combinations which can be used in the subject application. The lens units are used in the Numerical Examples 1 and 2 set forth below.

In the presently preferred embodiment, one of the first and second auxiliary lens units 2 and 3 is disposed at the rear of the master lens unit 1, the one being adapted to be placed on and off an optical axis X of the master lens unit 1.

Referring to FIG. 1(A), the first photographic unit includes the master lens unit 1 and the auxiliary lens unit 2, the wide-angle photographic unit 1 of a short focal length. Specifically, two lens units each having a positive refractive power are combined together so as to shorten the total focal length of the optical device by strengthening its total refractive power of the same.

Referring to FIG. 1(B), the first auxiliary lens unit 2, in the state shown in FIG. 1(A), is retracted from the optical axis X of the master lens unit 1 and at the same time the master lens unit 1 is protruded toward the object, so that the second photographic unit in a standard condition with a middle focal length is constituted by the master lens unit 1 only.

Referring to FIG. 1(C), the master lens unit 1, in the state shown in FIG. 1(B), is protruded toward the object and at the same time the second auxiliary lens unit 3 is disposed on the optical axis at the rear of the master lens unit 1, thereby constituting the third photographic unit of a long focal length. Specifically, the optical device as a whole assumes a telephoto-type arrangement to provide a lens arrangement easy to facilitate the achievement of a long focal length.

In this embodiment, the first, second and third photographic units are switched over therebetween in forward or reverse order. In addition, the first photographic unit may be switched over directly to the third photographic unit, and vice versa.

An optical unit with variable magnification heretofore adopts a method of switching over between two photographic units, so that it is difficult to obtain an optical device with variable magnification.

However, in this embodiment, the three lens units are used and suitably combined with one another, thereby making it easy to achieve an optical device with a high ratio of variable magnification and having an easy construction between wide-angle and telephoto photography.

In this embodiment, any of the first, second and third photographic units is arranged in such a manner that the master lens unit is placed on the side of the object to be photographed. For a focusing operation, a part or the whole of the master lens unit is moved to equalize the distances of travel of the lens elements with respect to the same object whichever of the photographic units may be selected. Thus, for example, even when an automatic focus detecting device is combined with this embodiment, a simple mechanism can be achieved.

The objects of the invention are attained by the above-described arrangement. In addition, in order to decrease fluctuations in various aberrations before and after switching and maintain suitable optical performance over the entire optical surface of the lens unit, it is preferable to fulfill the following requirements.

Specifically, the respective lens units are constructed in such a manner as to fulfill the following requirements:

$$0.5 < \frac{f_M/f_W}{f_T/f_M} < 1.5 \quad (1)$$

$$0.1 < E_W/f_M < 0.9 \quad (2)$$

$$0.1 < E_T/f_M < 0.9. \quad (3)$$

A number of various aberrations relating to the Numerical Examples set forth below are represented in graph form in FIGS. 3(A)-3(C) and 5(A)-5(C). $f_W$, $f_M$ and $f_T$ are respectively the focal lengths of the first, second and third photographic units, $E_W$, the interval between the principal points of the master lens unit and the first auxiliary lens unit constituting the first photographic lens unit, and $E_T$, the interval between the principal points of the master lens unit and the second auxiliary lens unit constituting the second photographic unit.

Requirement (1) is needed to distribute in a well-balanced manner the ratio of conversion of magnification when sequential switching is performed from the first to third photographic units to effect the proper correction of the aberrations of the respective photographic units. If the upper limit is exceeded, when the first photographic unit is switched over to the second photographic unit, the conversion ratio of variable magnification becomes too high, and this makes it difficult to correct the aberrations of the first photographic unit. Conversely if the lower limit is exceeded, when the second photographic unit is switched over to the third photographic unit, the conversion ratio of the variable magnification becomes too high and this makes it difficult to correct the aberrations of the third photographic unit.

Requirement (2) is needed to suitably set the interval between the principal points of the master lens unit and the first auxiliary lens constituting the first photographic unit. When the lower limit is exceeded, the master lens unit is placed too close to the first auxiliary lens unit, and this makes it difficult to constitute an actual lens unit. Conversely when the upper limit is exceeded, the positive refractive power of the first auxiliary lens unit is increased to an excessive extent, and a positive Petzval sum is increased. In consequence, the level of curvature of field is increased in a negative direction and an increased amount of halation occurs over the lens surface, and this badly affects the optical performance.

Requirement (3) is needed to suitably select the interval between the principal points of the master lens unit and the second auxiliary lens unit constituting the third photographic unit. When the lower limit is exceeded, the master lens unit too closely approaches the second auxiliary lens unit, and this makes it difficult to constitute the respective lens units. When the upper limit is exceeded, the negative refractive power of the second auxiliary lens unit is increased to an excessive degree and a negative Petzval sum is increased. In consequence, the level of the curvature of field is increased in a positive direction and this also badly affects the optical performance.

Numerical examples of the present invention are listed below. In the following numerical examples, $R_i$ represents the radius of curvature of the lens surface of an i-numbered lens counted from the object, $D_i$ the lens thickness of an i-numbered lens counted from the object and its air spacing, $N_i$ and $\nu_i$ respectively the refractive index and the Abbe number of the glass of an i-numbered lens counted from the object.

D7 in Numerical Example 1 and D6 in Numerical Example 2 respectively represent the interval between the master lens unit and the auxiliary lens unit when the latter is attached to the former. R, D, N, and $\nu$ correspond to the respective portions of the auxiliary lens unit attached to the master lens unit.

NUMERICAL EXAMPLE 1

Master Lens Unit
F = 70  FNO = 1:5.6  $2\omega$ = 34.4°

| | | | |
|---|---|---|---|
| R1 = 21.59 | D1 = 3.01 | N1 = 1.77250 | $\nu$1 = 49.6 |
| R2 = 265.88 | D2 = 2.34 | | |
| R3 = −56.66 | D3 = 2.00 | N2 = 1.66680 | $\nu$2 = 33.0 |
| R4 = 22.24 | D4 = 2.81 | | |
| R5 = −74.32 | D5 = 1.44 | N3 = 1.58144 | $\nu$3 = 40.7 |
| R6 = 7125.00 | D6 = 2.48 | N4 = 1.81600 | $\nu$4 = 46.6 |
| R7 = −30.58 | | | |

First Auxiliary Lens Unit
D7 = 1.49

| | | | |
|---|---|---|---|
| R8 = 21.09 | D8 = 2.27 | N5 = 1.88300 | $\nu$5 = 40.8 |
| R9 = 365.65 | D9 = 1.12 | | |
| R10 = −23.79 | D10 = 1.00 | N6 = 1.59270 | $\nu$6 = 35.3 |
| R11 = 21.55 | D11 = 1.15 | | |
| R12 = −33.73 | D12 = 2.88 | N7 = 1.69350 | $\nu$7 = 53.2 |
| R13 = −14.82 | | | |

Overall Units: F = 35, FNO = 1:2.8, $2\omega$ = 63.4°

Second Auxiliary Lens Unit
D7 = 2.71

| | | | |
|---|---|---|---|
| R8 = −109.13 | D8 = 2.97 | N5 = 1.67270 | $\nu$5 = 32.1 |
| R9 = −24.58 | D9 = 1.66 | | |
| R10 = −23.00 | D10 = 1.00 | N6 = 1.88300 | $\nu$6 = 40.8 |
| R11 = 96.43 | D11 = 0.10 | | |
| R12 = 54.12 | D12 = 2.95 | N7 = 1.53256 | $\nu$7 = 45.9 |
| R13 = −58.89 | | | |

Overall Units: F = 105, FNO = 1:8.5, $2\omega$ = 23.2°

$$\frac{f_M/f_W}{f_T/f_M} = \frac{2}{1.5} = 1.33$$

$E_W/f_M = 0.21$
$E_T/f_M = 0.21$

NUMERICAL EXAMPLE 2

Master Lens Unit
F = 80  FNO = 1:5.6  $2\omega$ = 30.2°

| | | | |
|---|---|---|---|
| R1 = 20.95 | D1 = 4.33 | N1 = 1.77250 | $\nu$1 = 49.6 |
| R2 = 66.13 | D2 = 2.91 | | |
| R3 = −465.96 | D3 = 3.01 | N2 = 1.69895 | $\nu$2 = 30.1 |
| R4 = 19.33 | D4 = 5.62 | | |
| R5 = 72.87 | D5 = 3.37 | N3 = 1.88300 | $\nu$3 = 40.8 |
| R6 = −112.90 | | | |

First Auxiliary Lens Unit
D6 = 1.62

| | | | |
|---|---|---|---|
| R7 = 30.05 | D7 = 2.47 | N4 = 1.88300 | $\nu$4 = 40.8 |
| R8 = 302.09 | D8 = 1.64 | | |
| R9 = −42.11 | D9 = 1.67 | N5 = 1.59270 | $\nu$5 = 35.3 |
| R10 = 27.27 | D10 = 1.33 | | |
| R11 = −44.33 | D11 = 1.52 | N6 = 1.69350 | $\nu$6 = 53.2 |
| R12 = −21.65 | | | |

Overall Units: F = 50, FNO = 1:3.5, $2\omega$ = 46.8°

Second Auxiliary Lens Unit
D6 = 1.81

| | | | |
|---|---|---|---|
| R7 = −50.26 | D7 = 1.84 | N4 = 1.67270 | $\nu$4 = 32.1 |
| R8 = −18.97 | D8 = 1.76 | | |
| R9 = −17.35 | D9 = 1.00 | N5 = 1.88300 | $\nu$5 = 40.8 |
| R10 = 112.85 | D10 = 0.10 | | |
| R11 = 51.07 | D11 = 3.22 | N6 = 1.53256 | $\nu$6 = 45.9 |
| R12 = −31.01 | | | |

Overall Units: F = 135, FNO = 1:9.5, $2\omega$ = 18.2°

$$\frac{f_M/f_W}{f_T/f_M} = \frac{2}{1.5} = 0.95$$

$E_W/f_M = 0.21$
$E_T/f_M = 0.21$

Figure 6:
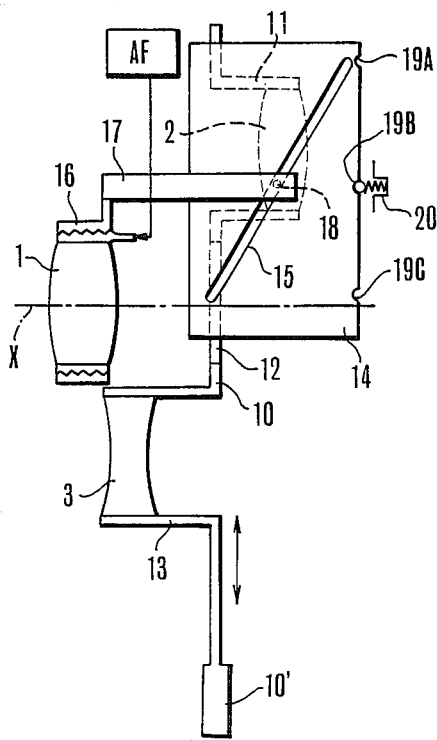
FIG. 6 is a plan view showing a driving mechanism.

FIG. 6 shows an example in which the master lens unit 1 is shifted toward the optical axis X and at the same time the first auxiliary lens unit 2 or the second auxiliary lens unit 3 is shifted in a direction perpendicular to the optical axis X.

A slide plate 10 is guided by a guide (not shown) for slidable movement in a direction perpendicular to the optical axis X. A cylindrical portion 11 is formed on the slide plate 10 so as to protrude toward the image-plane side, and supports the first auxiliary lens unit 2. An aperture is indicated by 12. A cylindrical portion 13 protrudes toward the object, and supports the second auxiliary lens unit 3. As a matter of course, apertures are respectively formed at the locations in which the cylindrical portions 11 and 13 of the guide plate 10 ar formed.

A cam plate 14 is secured to the upper portion of the slide plate 10 and a cam groove 15 is formed in the cam plate 14.

A lens barrel 16 is movably supported by a guide (not shown) toward the optical axis X. The lens barrel 16 includes an inner sleeve and an outer sleeve which are engaged with each other by a helicoid. When the inner sleeve is rotated, the master lens unit 1 is moved forwardly or rearwardly to effect focusing. A lever 17 is connected to the lens barrel 16 and a pin 18 provided at one end of the lever 17 is engaged with the cam groove 15. Click holes 19A, 19B and 19C are formed to receive the ball of a click 20.

In the above arrangement, when one end rearwardly, the first auxiliary lens unit 2, the aperture 12 and the second auxiliary lens unit 3 are exchangeably set on the optical axis, and the set position is held by the click 20. At this time, the cam plate 14 is slid concurrently with the movement of the slide plate 10 thereby driving the pin 18 engaged with the cam groove 15. Accordingly, the lever 17 is shifted toward the optical axis X to move the master lens unit 1 to a predetermined position on the optical axis X. Incidentally, an automatic focus detecting device AF effects focusing of the master lens unit 1.

What is claimed is:

1. A photographic optical device comprising:
   a master lens unit, having a positive refractive power, which determines a photographic optical path and is disposed to move along an optical axis thereof so at to change magnification;
   focus detecting means for detecting the focal adjustment of said photographic device and wherein at least part of said master lens unit is moved to effect focusing based on the detection result of said focus detecting means;
   a first auxiliary lens unit having a positive refractive power and capable of being placed on and off said photographic optical path; and
   a second auxiliary lens unit having a negative refractive power and capable of being placed on and off said photographic optical path;
   wherein said first auxiliary lens unit is located on the image-plane side of said master lens unit and forms a photographic unit giving a low ratio of magnification, said second auxiliary lens unit is located on the image-plane side of said master lens unit and forms another photographic unit giving a high ratio of magnification, and said first and second auxiliary lens units are placed outside of said photographic optical path to form another photographic unit giving a middle ratio of magnification.

2. A photographic optical device according to claim 1, wherein said master lens unit is positioned at a middle position at the middle ratio of magnification, on said image-plane side of said middle position at the low ratio of magnification, and on an object side of said middle position at the high ratio of magnification.

3. A photographic optical device according to claim 1, wherein said master lens unit, said first auxiliary lens unit and said second auxiliary lens respectively include a plurality of lens elements.

4. A photographic optical device comprising:
a master lens unit, having a positive refractive power, which determines a photographic optical path and is disposed to move along an optical axis thereof so as to change magnification;
a first auxiliary lens unit having a positive refractive power and capable of being placed on and off said photographic optical path; and
a second auxiliary lens unit having a negative refractive power and capable of being placed on and off said photographic optical path;
wherein said first auxiliary lens unit is located on the image-plane side of said master lens unit and forms a photographic unit giving a low ratio of magnification, said second auxiliary lens unit is located on the image-plane side of said master lens unit and forms another photographic unit giving a high ratio of magnification, and said first and second auxiliary lens units are placed outside of said photographic optical path to form another photographic unit giving a middle ratio of magnification; and
wherein letting $f_W$, $f_M$, $f_T$, denote the respective focal lengths of said photographic units at low, middle and high ratios of magnifications, $E_W$ the internal between the principal points of said master unit and said first auxiliary lens unit, and $E_T$ the interval between the principal points of said master unit and said second auxiliary lens unit, $$0.5 < \frac{f_M/f_W}{f_T/f_M} < 1.5$$

$$0.1 < E_W/f_M < 0.9$$

$$0.1 < E_T/f_M < 0.9$$

is satisfied.

5. A photographic optical device according to claim 4, wherein said master lens unit effects a focusing operation.

6. A photographic optical device according to claim 4, wherein said master lens unit is positioned at a middle position at the middle ratio of magnification, on said image-plane side of said middle position at the low ratio of magnification, and on an object side of said middle position at the high ratio of magnification.

7. A photographic optical device according to claim 4, wherein said master lens unit, said first auxiliary lens unit and said second auxiliary lens respectively include a plurality of lens elements.

8. A photographic optical device comprising:
a master lens unit, having a positive refractive power, which determines a photographic optical path and is disposed to move to an image-plane side, a middle position and an object side axial position along said optical path so as to change magnification;
focus detecting means for detecting the focal adjustment of said photographic device and wherein at least part of said master lens unit is moved to effect focusing based on the detection result of said focus detecting means;
a first auxiliary lens unit having a positive refractive power and capable of being placed on and off said photographic optical path; and
a second auxiliary lens unit having a negative refractive power and capable of being placed on and off said photographic optical path; and
means for placing said first auxiliary lens unit on said photographic optical path in relation to the movement of said master lens unit to a position on said optical axis on said image-plane side of said middle position, for maintaining said first auxiliary lens unit and said second auxiliary lens unit outside of said photographic optical path in relation to the movement of said master lens unit to a position on said optical axis corresponding to said middle position, and for placing said second auxiliary lens unit on said photographic optical path in relation to the movement of said master lens unit to a position on said optical axis on said object side of said middle position.

9. A photographic optical device according to claim 8, wherein letting $f_W$, $f_M$, and $f_T$ denote the respective focal lengths of said photographic units at low, middle and high ratios of magnifications, $E_W$ the internval between the principal points of said master unit and said first auxiliary lens unit, and $E_T$ the interval between the principal points of said master unit and said second auxiliary lens unit, $$0.5 < \frac{f_M/f_W}{f_T/f_M} < 1.5$$

$$0.1 < E_W/f_M < 0.9$$

$$0.1 < E_T/f_M < 0.9$$

is satisfied.

* * * * *